March 28, 1944.  F. H. CORBER  2,345,182
ADJUSTABLE SEAT
Filed Feb. 10, 1942  3 Sheets-Sheet 1
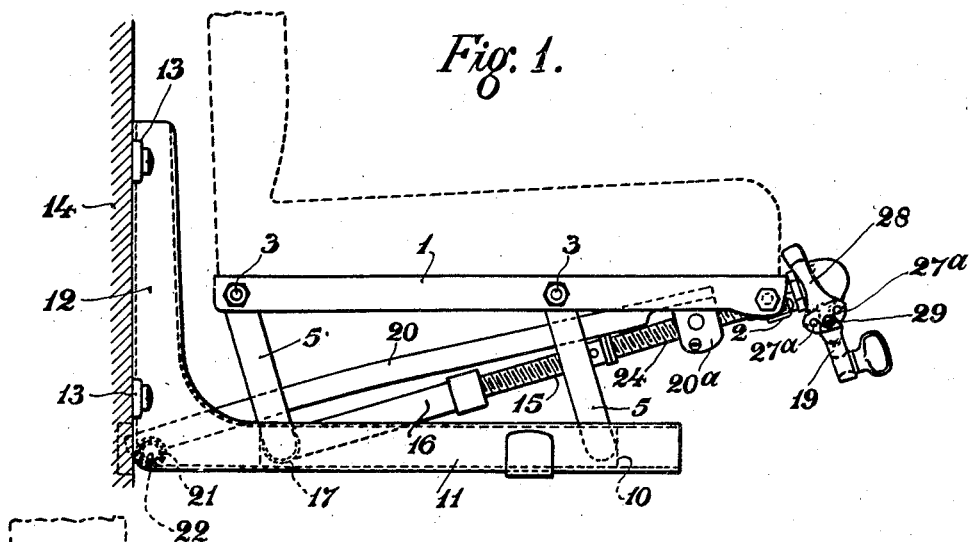
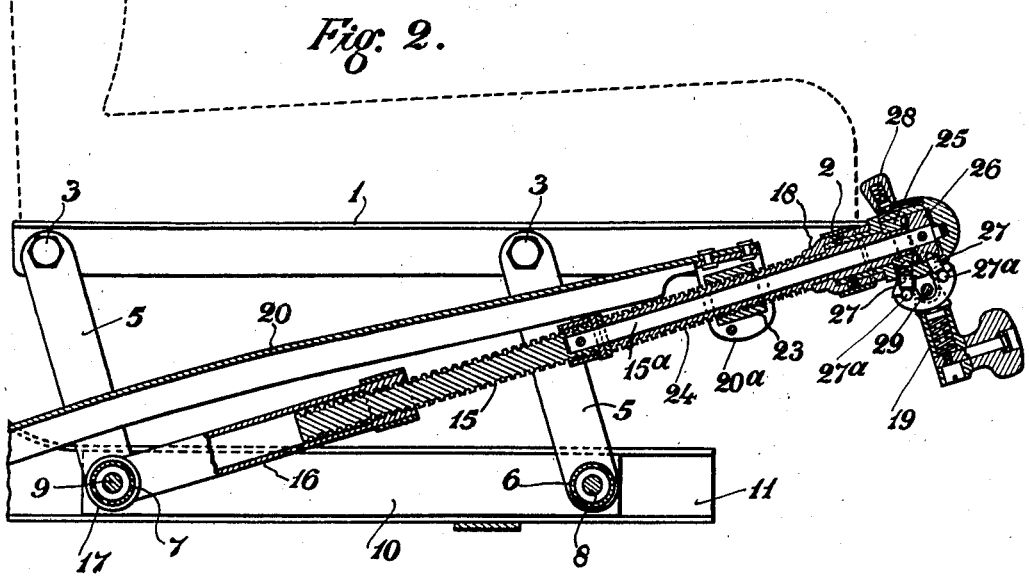
INVENTOR
Frederick Henry Corber
BY
his ATTORNEY

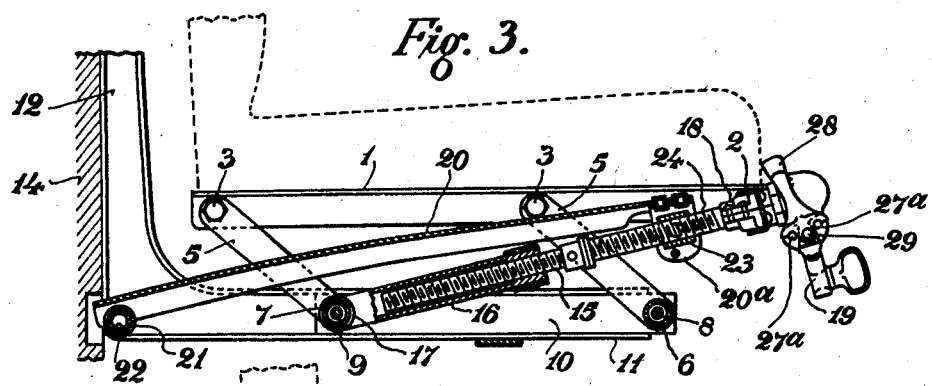
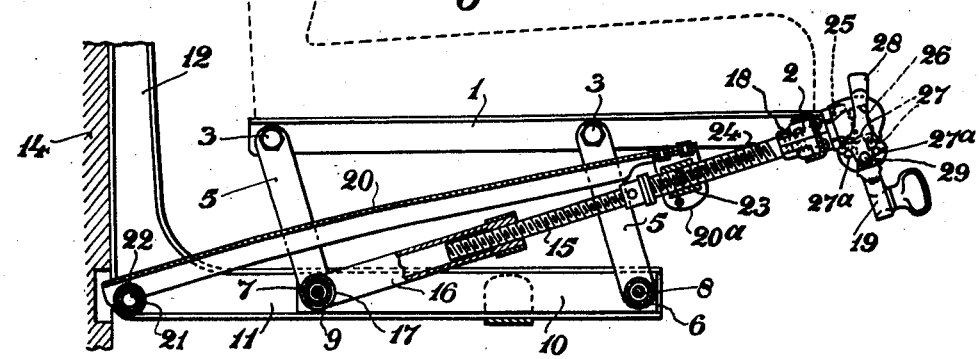
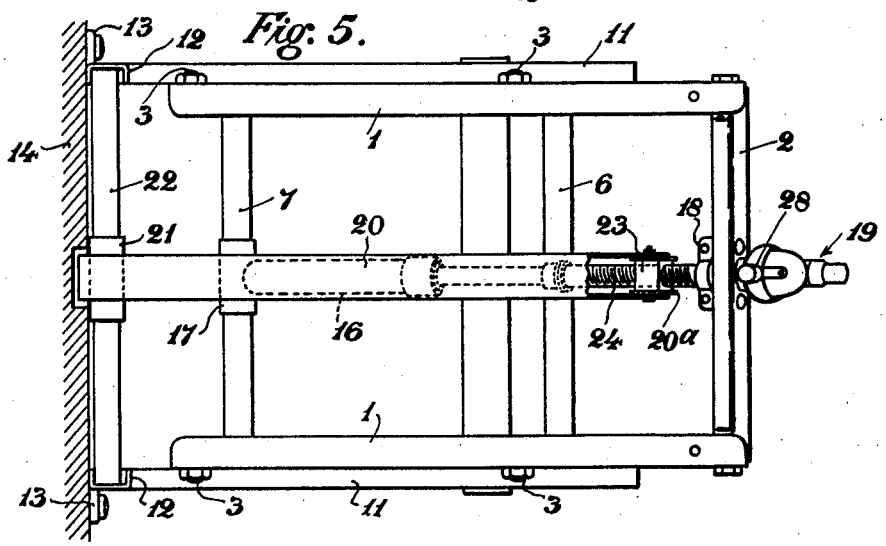

March 28, 1944.  F. H. CORBER  2,345,182
ADJUSTABLE SEAT
Filed Feb. 10, 1942  3 Sheets-Sheet 3
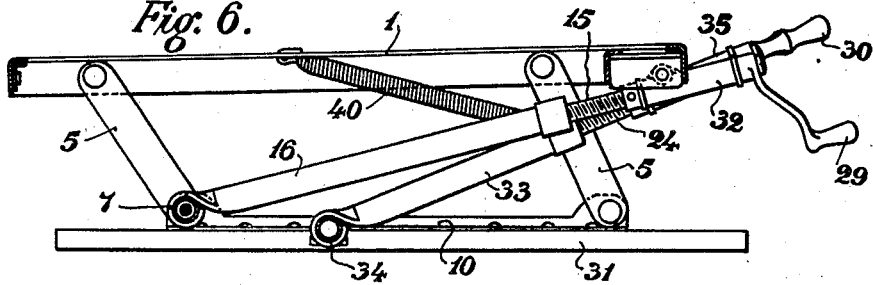
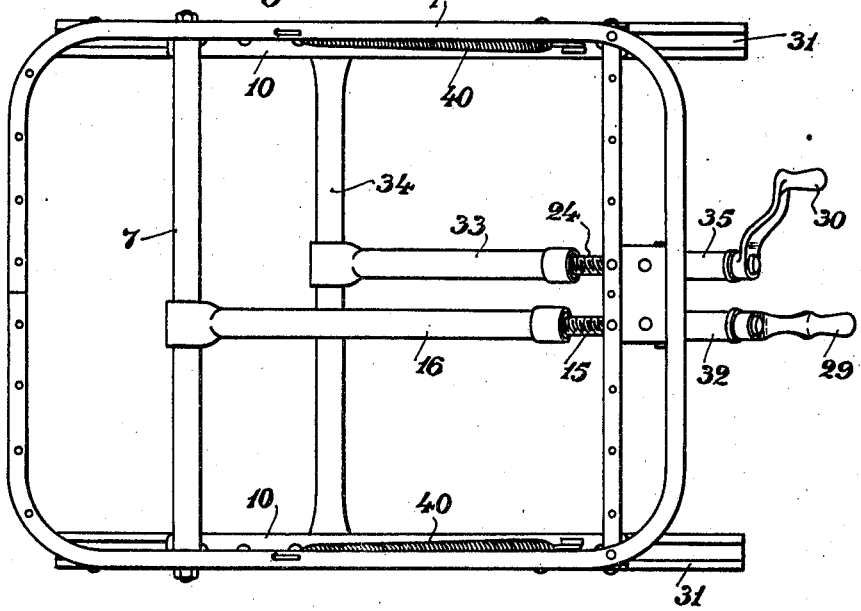
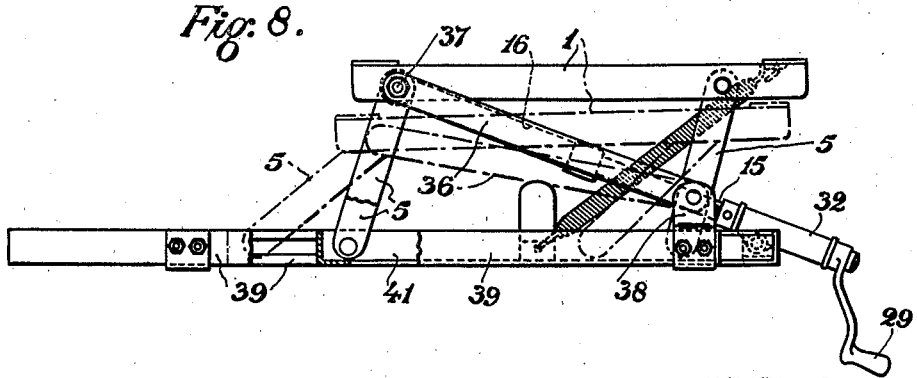
INVENTOR
Frederick Henry Corber
BY Joseph J. Juhasz
his ATTORNEY Patented Mar. 28, 1944

2,345,182

UNITED STATES PATENT OFFICE 2,345,182

ADJUSTABLE SEAT

Frederick Henry Corber, Chester, England, assignor of one-third to Arthur Sam Cheston, one-third to Edward Cyril Edmonds, and one-third to Basil Cheston, all of Birmingham, England Application February 10, 1942, Serial No. 430,213
In Great Britain March 8, 1941

10 Claims. (Cl. 155—91)

This invention relates to adjustable seats, particularly for use on vehicles, such seats being of that kind in which the seat top is adjustable in height by means of angularly-movable links disposed between the seat top and a base part, a pair of parallel-motion links being, for example, provided at each side of the seat. With such arrangements, as hitherto constructed, adjustment in the height of the seat top has resulted in the latter being moved a considerable distance in a forward or rearward direction, owing to the angular movement of the supporting links. This large forward and rearward movement is in many cases undesirable, and it is the object of the present invention to provide a seat of the kind referred to wherein the seat top may be adjusted vertically without any movement, or any substantial movement, of the said top in a forward or rearward direction.

According to the invention a seat is provided in which the seat top is supported and is adapted to be adjusted in height by angularly-movable links slidably connected at one end, means being provided for preventing or restricting movement of the seat top in a forward and rearward direction during such adjustment in height of the seat top. Thus, the seat may comprise a seat top disposed above a base and supported at each side by links pivoted to the seat top at their upper ends and coupled together at their lower ends by a slide, the links being operated, to raise and lower the seat top, by an obliquely disposed screw device, and movement of the seat top in a forward and rearward direction, during such height adjustment, being restrained by a radius member obliquely disposed between the base and seat top, and preferably including a screw device, so that its effective length may be varied, when desired, in order to move the seat top, with the links and slides, bodily in a forward or rearward direction. The screw device for adjusting the height of the seat and the screw device which forms part of the radius member may comprise concentric shafts arranged and operated by a common actuating handle through a clutch device.

Figure 1 of the accompanying drawings represents a side view of a motor vehicle seat adapted to be adjusted in height and provided, in accordance with this invention, with means for restraining the seat top against movement in a forward and rearward direction during such height adjustment, the seat being shown with the seat top raised.

Figure 2 represents a vertical section through the seat when in the position shown in the preceding figure.

Figure 3 is a sectional view with the seat top lowered, the screw-shafts and clutch casing being in elevation.

Figure 4 shows a sectional view through the seat with the top raised but moved forwardly by increasing the effective length of the radius member.

Figure 5 represents a plan view of the seat on a smaller scale, with the radius member being partly in section.

Figure 6 illustrates a side elevation of a modified form of seat in which independent operating handles are provided for adjusting the height of the seat top and for moving the latter in a forward and rearward direction.

Figure 7 is a plan view of the seat shown in Figure 6.

Figure 8 illustrates a further modified arrangement.

Referring to Figures 1 to 5 of the drawings, the improved seat comprises a cushion-supporting top frame which consists of a pair of angle-sectioned metal side members 1 connected together by a front transverse bar 2, each side member being jointed at 3 to the upper ends of a pair of parallel-motion links 5. The lower ends of each pair of links 5, which adjustably support the top of the seat, are fixed or welded to the ends of transverse tubes 6 and 7, so that corresponding links at the two sides of the seat are connected together by the said tubes and move in unison, whilst passing through these tubes 6 and 7, and through holes in the lower ends of the links 5, are rods 8 and 9, these rods serving pivotally to connect the lower ends of the links to slides 10, disposd one at each side of the seat and each movable in a guide 11 forming part of a fixed base. The slides 10 and the guides 11 are both of a channel section, the channels being set on edge, the guides 11, in the arrangement shown, being in the form of cantilever brackets carried by integral vertical parts 12 fixed, such as by lugs 13 (Figure 1) to a bulkhead 14. The arrangement is such that the seat top may be raised or lowered by moving the links 5, by which it is supported, angularly. This angular movement of the supporting links, and consequently the adjustment in height of the seat top, is effected by means of an obliquely-disposed screw device comprising an externally-screwed shaft 15 engaging an internally-threaded part of a tube 16 which is hinged at its lower end, by a short tubular cross-piece 17 (Figure 5), to the tube 7 connecting the lower ends of the rear pair of links, the shaft 15 being attached to a plain unthreaded portion 15ᵃ (see Figure 2) passing through a supporting part 18 carried by the front cross-bar 2 of the seat top and operatively connected to a cranked handle 19. The cross-bar 2 is swivelly mounted between the side bars 1 of the top frame of the seat, and by means of the handle 19 the shaft 15 may be rotated and screwed into, or out of, the tube 16, this movement causing the links 5 to move angularly and the top of the seat to be raised or lowered.

If the seat top supporting links 5 were joined at their lower ends to a fixed part the angular movement of the said links would obviously cause the seat top to be moved a considerable distance either in a forward or in a rearward direction, according to whether the seat top is being raised or lowered, this forward and rearward movement being in many cases a definite disadvantage. In order to restrict the seat from moving in a forward or rearward direction during an adjustment in height of the seat, the lower ends of the supporting links 5 are jointed to the slides 10, as stated, and, in addition, a radius member is provided connected to the seat top and to a stationary part. This radius member comprises, in the construction shown, an obliquely-disposed bar 20, conveniently of an inverted-channel section, jointed at its lower rear end, by a sleeve 21 (Figure 5), to a transverse tube 22 rigidly connecting together the rear ends of the fixed brackets 11, the upper forward end of the bar carrying a nut 23 swivelly mounted between depending ears 20ᵃ on the said bar. This nut 23 is engaged by a screwed rod or shaft 24 passing through the supporting part 18 on the front cross-bar 2 of the seat top, so that the radius member is thus formed by the bar 20 and that part of the screwed shaft 24 between the cross-bar 2 of the seat top and the nut 23, the radius member thus formed positively preventing any substantial movement of the seat top in a forward or rearward direction during the raising and lowering of the said top although a very slight forward or rearward movement does take place owing to the arcuate path through which the forward end of the radius member, which turns about the tube 22, moves. During, however, the full range of height adjustment this forward or rearward movement does not exceed ⅜ of an inch and is for all practical purposes negligible.

The effective length of the radius member may be varied, if desired, by rotating the shaft 24 so that it screws more or less into or out of the nut 23 (although a fixed radius member may be provided if desired). The object of making the effective length of the radius member adjustable is to enable the whole seat to be moved bodily forwards or rearwards, should this be at any time desired. The shaft 24 is arranged to be rotated by the same handle which serves to rotate the shaft 15, that is by the handle 19, either shaft being adapted to be selectively coupled to the latter. Thus, the screwed shaft 24 surrounds and is concentric with, the plain unthreaded extension 15ᵃ of the shaft 15, the forward end of the shaft 15ᵃ and the forward end of the shaft 24, both of which are supported by the part 18 on the front cross-bar of the seat top, so that they are prevented from moving axially relatively thereto, carrying collars 25 and 26 respectively (Figure 2), either collar being adapted to be coupled to the handle 19 by one or other of the T-shaped pins 27. These pins 27 are adapted to be moved into, or out of, their operative positions by the control 28 pivoted at 29 to the handle and engaging the cross-bars 27ᵃ of the pins, and when the control 28 is in the position shown in Figure 2 the collar 26, and consequently the shafts 15 and 15ᵃ, is clutched to the handle 19. When, however, the control 28 is moved into the position shown in Figure 4 the collar 25, and consequently the shaft 24, is connected to the handle.

In operation, when it is desired to raise or lower the seat top, the handle-control 28 is moved into the position shown in Figure 2, thus coupling the handle 19 to the shafts 15, 15ᵃ. Rotation of the handle now causes the shaft 15 to screw into, or out of, the tubular housing 16, so that the links 5 are compelled to move angularly and the height of the seat top is either increased or decreased, according to the direction of rotation of the handle. Since the seat top is constrained from movement in a forward or rearward direction by the radius member during this height variation the slides 10 to which the lower ends of the supporting links 5 are connected move within their guides 11. Normally the radius member (comprising the bar 20, and the part of the shaft 24 between the cross-bar 2 and the nut 23) is of a constant length, but should it be desired at any time to move the seat either in a forward or rearward direction, the handle-control 28 is moved into the position shown in Figure 4 thereby coupling the handle 19 to the shaft 24. Rotation of the handle now turns the latter and increases or decreases the length of the radius member, the shaft 24 screwing into or out of the nut 23. The seat top, with the supporting links 5 and the slides 10, is now moved forwards or rearwards, the slides 10 moving within their guides, the seat assuming, for example, the position shown in Figure 4. During this forward and rearward movement no variation in the height of the seat takes place.

In the arrangement illustrated in Figures 6 and 7 of the drawings, the seat is operated in substantially the same manner, but independent handles 29 and 30 are provided for raising or lowering the seat top, and for moving the seat in a forward or rearward direction, the height-adjusting mechanism and the radius member being separate. Thus, referring to these figures, the seat top comprises a rectangular frame 1 supported at each side by parallel-motion links 5 jointed at their lower ends to slides 10 mounted in fixed channelled guides 31 which may, in this case, be secured to the floor of the vehicle. The seat top 1 is adapted to be raised or lowered by a screw-shaft 15 engaging an internally-threaded part in an obliquely-disposed tubular housing 16 swivelly attached to a cross-bar 7 connecting together the lower ends of the two rear links. The screw-shaft 15 passes through a bearing 32 swivelly connected to the front bar of the seat top 1 and is fitted with the cranked handle 29. By turning the latter the shaft 15 is screwed into, or out of, the tubular housing 16 and the links 5 are moved angularly so that the seat top 1 is raised or lowered the slides 10 moving within their guides 31. Springs 40 may be provided which tend to relieve the load during the raising of the seat top. The seat top is constrained against movement in a forward or rearward direction whilst it is being adjusted in height by the radius member which is formed by the shaft 24 screwing into the tubular housing 33, the latter being disposed obliquely and being swivelly connected at its lower end to the cross-tube 34 attached to the fixed guides 31. The forward portion of the shaft 24 passes through a bearing 35 swivelly attached to the front bar of the seat top and at its outer end the handle 30 is fixed. The effective length of the radius member (comprising the tube 33 and that part of the shaft 24 between the latter and the front bar of the seat top) normally remains constant, turning about the cross-tube 34 when the seat top is raised or lowered. If, however, it is desired to move the seat bodily in a forward or rearward direction the shaft 24 is screwed into, or out of, the tube 33 by the handle provided, and the seat top, with the links 5 and slides 10, is moved either forwardly or rearwardly, no alteration in the height of the seat top taking place.

Figure 8 of the drawings illustrates an arrangement having a fixed radius member in the form of a link 36 at each side of the seat, the link being jointed to the seat top 1, at 37, and being jointed to a bracket 38 on the fixed guide 39 at its lower end. The seat top is supported by the links 5 jointed at their lower ends to a slidable base frame 41 engaging the guides 39, and in order to adjust the seat top in height a screwed shaft 15 engaging a tube 16 is provided. Both the tube 16 and shaft 15 are obliquely arranged, and the tube, in this case, is jointed to a cross-member connecting the upper ends of the rear supporting links, whilst the shaft 15 engages a bearing 32 on the front bar of the sliding base frame 41, the handle 29 fitted to the outer end of the shaft being adjacent the said base frame instead of being adjacent the seat top. The arrangement operates in substantially the same way as previously described, the height of the seat top (which is restrained from forward and rearward movement by the radius link 36 at each side) being varied, as required, by turning the handle 29 and rotating the shaft 15.

The seat top may be constrained against movement in a forward and rearward direction during its adjustment in height by any other suitable means. It may, for example, carry lateral projections engaging fixed vertical guide channels, for this purpose.

I claim:

1. A seat comprising a seat top, links supporting the seat top, a slide connecting the ends of the links, a screw device for operating the slide to vary the angular positions of the links and adjust the height of the seat top, and a radius member for restricting movement of the seat top in a forward and rearward direction during such height adjustment of the seat top.

2. A seat comprising a seat top, links at each side of the seat top, pivoted to and supporting the latter, slides connecting the lower ends of the links at each side, members engaging and forming guides for the slides, means for operating the slides and links to vary the height of the seat top, and a radius member for limiting forward and rearward movement of the seat top during such height adjustment.

3. A seat comprising a seat top, links at each side of the seat top, pivoted to and supporting the latter, slides connecting the lower ends of the links at each side, members engaging and forming guides for the slides, a screw device for operating the slides and links to vary the height of the seat top, a fixed part and a radius member extending between and connected to the said fixed part and the seat top for limiting forward and rearward movement of the seat top during such height adjustment.

4. A seat comprising a seat top, links supporting the seat top, a slide connecting the ends of the links, means for varying the angular positions of the links to vary the height of the seat top, a radius member for restricting movement of the seat top during the adjustment in height of the latter, and means for varying the length of the radius member to move the seat in a forward and rearward direction.

5. A seat comprising a seat top, links at each side of the seat top, pivoted to and supporting the latter, slides connecting the lower ends of the links at each side, a fixed part, guides engaging the slides, a screw device for operating the slides and the links to vary the height of the seat top, a radius member extending between and connected to the fixed part and the seat top for restricting forward and rearward movement of the seat top during height adjustment of the latter, and means for varying the length of the radius member to move the seat in a forward and rearward direction.

6. A seat comprising a seat top, links at each side of the seat top, pivoted to and supporting the latter, slides connecting the lower ends of the links at each side, fixed guides engaging the slides, a screwed shaft for operating the slides and the links to vary the height of the seat top, a second screwed shaft, a part engaged by the latter, the said second shaft and the engaging part forming an adjustable radius member for restricting forward and rearward movement of the seat top during its height adjustment, an operating handle, and a clutch device for selectively coupling the operating handle to either of the shafts.

7. A seat comprising a seat top, links at each side of the seat top pivoted to and supporting the latter, slides connecting the lower ends of the links at each side, fixed guides for the slides, a screwed shaft, a co-operating screwed part engaging the latter, means for rotating the shaft to vary the inclination of the links and the height of the seat top, a second screwed shaft, a part engaging the latter, the said second shaft and its engaging part forming a radius member for restraining the seat top against movement in a forward and rearward direction during its height adjustment, and means for rotating the said second shaft to vary the effective length of the radius member to move the seat top in a forward and rearward direction.

8. A seat comprising a seat top, parallel-motion links supporting each side of the seat top, the said links being pivoted to the latter at their upper ends, a slide connecting the lower ends of the links at each side, a cross-bar connecting two opposite links, fixed guides for the slides, a part connecting the fixed guides, a screwed shaft, an internally-screwed part co-operating with the said shaft, the said shaft and co-operating part extending obliquely between the seat top and the link-connecting cross-bar, means for rotating the shaft to vary the inclination of the links and the height of the seat top, and a radius link connected to the part connecting the fixed guides and to the seat top to restrain the latter against movement in a forward and rearward direction during its adjustment in height.

9. A seat comprising a seat top, parallel-motion links supporting each side of the seat top, the said links being pivoted to the latter at their upper ends, a slide connecting the lower ends of the links at each side, a cross-bar connecting two opposite links, fixed guides for the slides, a part connecting the fixed guides, a screwed shaft, an internally-screwed part co-operating with the said shaft, the said shaft and co-operating part extending obliquely between the seat top and the link-connecting cross-bar, means for rotating the shaft to vary the inclination of the links and the height of the seat top, a radius link connected to the part connecting the fixed guides and to the seat top to restrain the latter against movement in a forward and rearward direction during its adjustment in height, and means for varying the effective length of the radius link.

10. A seat comprising a seat top, parallel-motion links supporting each side of the seat top, the said links being pivoted to the latter at their upper ends, a slide connecting the lower ends of the links at each side, a cross-member connecting two opposite links, fixed guides for the slides, a part connecting the fixed guides, a screwed shaft for varying the height of the seat top, an internally-threaded tubular part engaging the screwed shaft, the said shaft and tubular part extending between the seat top and the cross-member connecting the links, a second screwed shaft, a co-operating part engaging the latter, the said second shaft and the co-operating part being connected to the seat top and to the part connecting the fixed guides and forming an adjustable radius member to restrict movement of the seat top in a forward and rearward direction during its height adjustment, an actuating handle, and a clutch device selectively to connect the operating handle to either of the screwed shafts.

FREDERICK HENRY CORBER.